United States Patent [19]

Majewski, Sr. et al.

[11] Patent Number: 5,394,978
[45] Date of Patent: Mar. 7, 1995

[54] PLATE-TYPE CONVEYOR UTILIZING IMPROVED POWER APPLYING MEANS

[75] Inventors: Theodore J. Majewski, Sr., Clermont; Phillip L. Lee, Leesburg, both of Fla.

[73] Assignee: G&T Conveyor Company, Inc., Tavares, Fla.

[21] Appl. No.: 128,837

[22] Filed: Sep. 29, 1993

[51] Int. Cl.6 ............................................. B65G 23/14
[52] U.S. Cl. ................................. 198/833; 198/831
[58] Field of Search ............... 198/321, 831, 832, 833, 198/853

[56] References Cited

U.S. PATENT DOCUMENTS

| | | |
|---|---|---|
| 635,177 | 10/1899 | McCabe. |
| 2,850,149 | 9/1958 | Bankauf. |
| 3,107,773 | 10/1963 | Clemetsen et al.. |
| 3,366,217 | 1/1968 | Tosato et al.. |
| 3,387,697 | 6/1968 | Harrison. |
| 3,410,390 | 11/1968 | Petersen ........................ 198/833 X |
| 3,435,780 | 4/1969 | Czarnecki et al.. |
| 3,498,445 | 3/1970 | Piper ................................. 198/833 |
| 3,554,360 | 1/1971 | Bildsoe. |
| 3,877,567 | 4/1975 | Sommerfield .................. 198/833 |
| 3,893,564 | 7/1975 | Raynor et al. ................. 198/833 |
| 3,994,390 | 11/1976 | Peterson, Jr. et al.. |
| 4,361,220 | 11/1982 | Kraft ............................... 198/833 X |
| 5,042,648 | 8/1991 | Garvey ............................ 198/833 X |

FOREIGN PATENT DOCUMENTS

1341381 12/1973 United Kingdom.
0919944 4/1982 U.S.S.R..

Primary Examiner—James R. Bidwell
Attorney, Agent, or Firm—Julian C. Renfro

[57] ABSTRACT

A conveyor arranged to travel along a prescribed path, the upper surface of which conveyor being constituted by a comparatively large number of separate segments, with each segment supported by a carriage member. The conveyor utilizes a substantial number of interconnected carriage members, with at least one elongate linear sprocket attached to each carriage member. Each linear sprocket has a number of consistently spaced, generally downwardly directed teeth, which are successively brought into operative contact with components of a powered endless chain that is disposed under, and in general alignment with, the intended path of travel of the carriage members. The upper surface of the chain travels in the same direction as the intended direction of movement of the conveyor, with the teeth of the linear sprockets positioned so as to successively come into an exceeding smooth, highly effective relationship with the components constituting the upper surface of the chain as said carriage members travel around the prescribed path. The teeth of at least two of the linear sprockets at any one moment engage the components of the upper surface of the chain, with the chain thus providing power that causes the carriage members and the segments supported thereby to move at a uniform speed around the prescribed path of travel for the conveyor. The lower edge of each tooth of each linear sprocket is provided with a suitable clearance radius, to assure smooth engagement and disengagement with the chain.

24 Claims, 6 Drawing Sheets

PLATE-TYPE CONVEYOR UTILIZING IMPROVED POWER APPLYING MEANS

BACKGROUND OF THE INVENTION

Anyone who has flown commercially in recent years has doubtless had the experience of lifting his or her luggage off of a conveyor belt of the type used by all airlines for transporting hand luggage from a location where it was off loaded from a baggage truck used to convey luggage from an arriving aircraft, to the luggage delivery room of the airport, where the travelers are waiting to reclaim their luggage.

In most instances, the conveyor belt is not a belt at all, but rather a series of separately supported, carefully contoured metal plates joined together in an articulated manner so as to permit the luggage-conveying device to make many turns as it snakes through the luggage delivery room.

Although a number of the prior art luggage delivering devices have been relatively successful, many of such devices have suffered the disadvantage of failing to have noise-free operation in public areas.

It was in an effort to provide a conveyor having particularly quiet operation as well as requiring less input power, reduced installation time and lower perfoot cost that the present invention was evolved.

SUMMARY OF THE INVENTION

Our invention primarily relates to a baggage handling conveyor arranged to transport luggage along a prescribed path through the baggage room of an airport or the like, so as to move such luggage from the baggage loading area to the baggage claim area. However, we are not to be limited to this, for our novel conveyor could be used for other purposes. As one example, a crescent plate conveyor in accordance with our invention may also be used as a bag make-up conveyor where outbound bags are sorted for various frights. As an example of non-airport applications, our conveyor could advantageously be utilized in conjunction with mail sorting and package handling. Other uses will be obvious to those skilled in the art.

Our novel conveyor has an upper surface constituted by a comparatively large number of separate segments, such as segments of crescent shape, with each segment supported by a wheeled carriage member. Our conveyor is principally constituted by a comparatively large number of interconnected wheeled carriage members, with each carriage member having a central structural member disposed along its longitudinal centerline. At least one elongate linear sprocket is attached to the central structural member of each carriage member, with each linear sprocket having a straight side along which a number of consistently spaced, generally downwardly directed teeth are disposed.

Our conveyor utilizes a highly effective power-applying means for causing the conveyor to undertake a smooth, non-jerky motion, with this power-applying means utilizing an endless chain operatively disposed under the carriage members of the conveyor, and in alignment with the path of travel of the conveyor at that location. The spacing of the links and rollers of the chain matches the spacing of the teeth of the linear sprockets, and a multiple of chain pitches exactly matches the distance between teeth on leading and trailing linear sprockets utilized on the carriage members.

A pair of circular sprockets support the endless drive chain such that the upper, operative surface of the endless chain is maintained in a relatively taut condition, such that the teeth of our linear sprockets attached to the carriage members are positioned so as to successively come into an operable relationship with the upper, active surface of the endless chain as the carriage members travel around the prescribed path.

It is to be noted that the circular sprocket members are spaced sufficiently far apart as to assure that at no time are there less than all of the teeth of two linear sprockets in effective contact with the operative, active surface of the drive chain. Typically the operative or active portion of the drive chain is sufficiently long as to permit at least some portions of the sprockets utilized on three successive carriages to be in simultaneous contact with the drive chain. By way of a specific example, the teeth of a third linear sprocket must have started to engage the operative, active surface of the chain during the same time period in which the teeth of a first sprocket are in the process of disengaging from the chain. All of the teeth of the second linear sprocket, located between the first and third linear sprockets, are of course in contact with the drive chain at this particular time.

As should now be clear, the means for applying power to the drive chain causes such upper or active surface of the endless chain to travel in the same direction as the intended direction of movement of the conveyor, whereas with the lower or return span of the endless chain travels in the opposite direction.

As a result of this arrangement we use, continuous power is applied to the conveyor, with this causing the carriage members and the crescent-shaped segments supported by the carriage members to move around the prescribed path of travel of the conveyor in a particularly smooth, quiet manner.

It is to be understood that each adjacent pair of carriage members is interconnected by the use of a vertically disposed pin, thus to form a flexible connection between a given carriage member, and the carriage member on either side of it. The vertically disposed pin also serves as the mounting means for a guide wheel disposed to rotate in a horizontal plane about a vertically disposed axis. A guide channel is mounted in the prescribed path of travel of the carriage members, with a guide wheel being disposed between each adjacent pair of carriages. Because the guide wheel interacts in a particularly satisfactory manner with the guide channel, the carriage members move smoothly around the prescribed path of travel of the conveyor.

As an option, a linear sprocket may, in accordance with our invention, be attached on each side of the central structural member of each carriage member, with the endless drive chain being of extended width so as to operatively interact with the teeth of the linear sprockets on both sides of the central structural member of each carriage member.

The power-applying sprocket operatively associated with the drive chain is mounted forward of the circular sprockets concerned with chain support, or in other words, the toothed, power-applying sprocket is positioned immediately before the endless chain turns to travel in its return path, which of course is the direction opposite the direction of travel of the conveyor. In this way the power-applying sprocket not only serves to cause desirable, consistent movement of the chain, but also it assists in maintaining the upper surface of the endless chain in a relatively taut condition. Contributing to the drive chain being maintained in a taut condition that assures proper and sufficient contact with the teeth of the linear sprockets is our use of a chain guide of conventional design.

We have found that by placing the power-applying sprocket at a slightly lower level than the circular sprockets concerned with chain support, the portion of the drive chain extending between the circular sprocket and the power-applying sprocket is inclined downwardly at an angle. This arrangement is particularly effective in assisting in the smooth, non-abrupt disengagement of the teeth of the linear sprocket from the chain.

It is therefore a primary object of our invention to provide a conveyor requiring less input power as well as costing less on a per-foot basis than most comparable conveyors.

It is another important object of our invention to provide a conveyor characterized by its quietness and smoothness.

It is yet another object of this invention to provide a conveyor requiring a substantially reduced number of man hours for its installation, and necessitating less periodic maintenance.

It is still another object to provide a conveyor capable of having unlimited length, made possible by the possible use of multiple drives in accordance with our invention.

It is yet still another object of our invention to provide linear sprockets carefully configured so that each tooth of each linear sprocket is contacted by a roller of the drive chain at a zero pressure angle.

It is yet still another object of our invention to provide a particularly effective arrangement for the smooth engagement and smooth disengagement of the teeth of the linear sprocket from the drive chain.

These and other objects, features and advantages of our invention will become more apparent as the description proceeds.

DETAILED DESCRIPTION

Figures 1, 2:
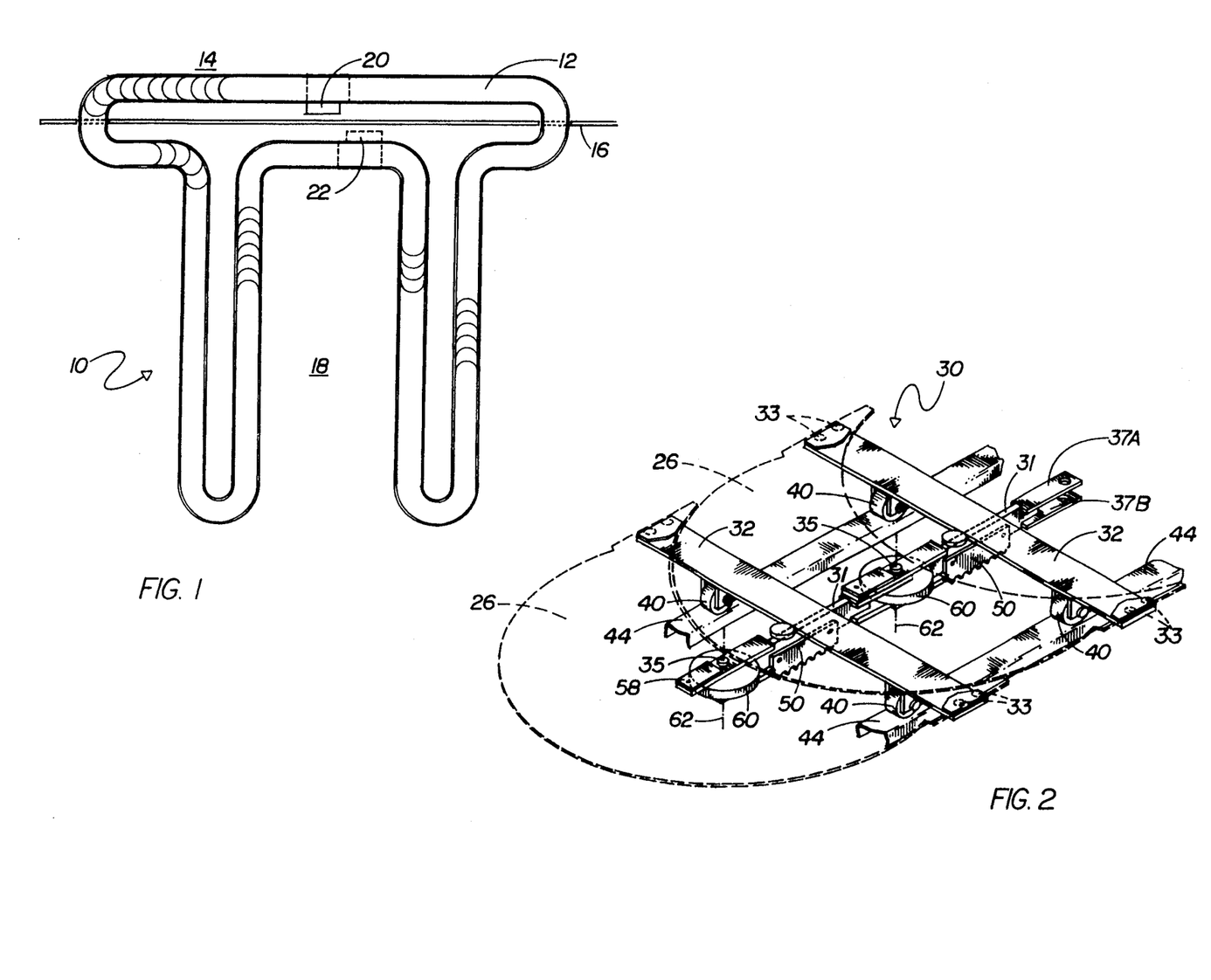
FIG. 1 is a plan view depicting a typical circuit or path followed by a conveyor in accordance with this invention, in this instance a conveyor of the type typically used in an airport for transporting baggage from the baggage loading area to the baggage claim area.
FIG. 2 is a perspective view of a typical pair of carriages of the type we utilize in interconnected relationship to form a conveyor, with certain portions being broken away so that internal construction will be revealed.

With reference now to the drawings, FIG. 1 is an illustration of a conveyor arrangement 10 of the general type used by many airlines, which conveyor serves to move the luggage along a path or circuit 12 from a bag loading area 14 adjacent the parking ramp for the arriving aircraft, out past the wall 16 and into the bag claim area or luggage delivery room 18. Power for causing the conveyor to move at a steady pace around the circuit 12 representative of a typical path of travel may be applied at a single power applying location 20, but in certain instances, such as in the case of a particularly long conveyor, power may be applied at more than one location, such as at a second power applying location 22. The power means typically takes the form of an electric motor driving an endless drive chain serving, in a novel manner, to successively apply forward motion to each of the separate but flexibly interconnected carriage members that constitute our novel conveyor 10, with this being accomplished in a particularly smooth, jerk-free manner.

Although our invention is primarily directed to usage related to the transport of a traveler's baggage from one location to another in a depot, station or airport, we are not to be limited to this usage, for a crescent plate conveyor in accordance with our invention may also be used as a bag make-up conveyor where outbound bags are sorted for various flights. Furthermore, our invention could advantageously be utilized in non-airport applications, such as in conjunction with mail sorting and package handling.

The present invention is concerned with a specific and highly advantageous means for applying power to the conveyor at the principal location 20, but before we explain the specific details of our novel power-applying means, it is advisable to point out some of the overall aspects of our novel conveyor arrangement.

With reference now to FIG. 2 it will be seen that a pair of plates each represented by reference numeral 26 are hereinafter referred to as "crescent flat plates." It is to be understood that a few dozen to a large number of such crescent-shaped flat plates 26 are utilized throughout the length of the conveyor arrangement 10, with the curved, closely spaced adjacent edges of these plates enabling them to easily change their relationship to each other as our flexibly connected conveyor travels around the many turns of its circuitous path 12.

Each of the numerous crescent flat plates 26 is supported by a respective carriage member 30, with an upper part of each carriage member taking the form of an elongate member 32 disposed in a right angle relationship to the path of travel of the conveyor components. We may refer to an elongate member 32 either as a plate support member or a cross bar, and each of these members is secured, such as by welding, to the carriage link 31, which is a structural member extending along the length of a typical carriage, and in effect serving as the backbone of the carriage. The carriage link or central structural member 31 is visible in clearer detail in FIG. 7, and will be discussed at length hereinafter.

Each flat plate 26 may be readily and removably secured to the respective plate support member or cross bar 32, such as by screws 33; note FIG. 2. In addition, a screw 34 may be utilized to secure a front part of the crescent flat plate to a front part of the carriage; note FIG. 4.

It is to be understood that both of the carriage members 30 depicted in FIG. 2 are substantially identical to each other, as well as being substantially identical to all of the other carriage members of the entire array.

As mentioned hereinabove, each plate support member or cross bar 32 is in turn secured, such as by welding, to a central structural member or carriage link 31, this juncture being clearly shown in FIG. 9. It is to be understood that the central structural member or carriage link 31 is disposed along the longitudinal centerline of each carriage member 30, and is of sturdy construction, preferably of steel ¼" in thickness. It is to be noted that the central structural member or carriage link bar 31 is not required to form a right angle with the cross bar or plate support member 32, but a right angle relationship is typical.

There is no requirement that the flat plates 26 be operated in a precisely horizontal attitude, so if the plates 26 of the conveyor are disposed at an angle to the horizontal, the linear sprockets 50 would not then be vertical, or in other words, not then disposed at a right angle to the horizontal. For this reason, we prefer to regard the teeth 54 of the linear sprockets 50 as being generally downwardly directed, rather than in every instance residing precisely in a vertical attitude.

As will hereinafter be discussed in conjunction with FIG. 7, certain components known as pivot plates are secured, such as by welding, to the front and to the rear of each carriage link or central structural member 31. The arrangement we prefer involves a spaced pair of pivot plates welded to the front, which plates are spaced widely enough apart as to receive in a flexible, low friction manner, the spaced pair of pivot plates welded to the rear of the carriage link or central structural member 31 of the carriage directly in front. Such ancillary, horizontally disposed components secured to each carriage link or central structural member 31 thus enable the front of each link or member 31 to be pinned to the rear of the link or member located directly in front, whereas the rear of each link or member 31 is pinned to the front of the link or member immediately following. Therefore, because each carriage link 31 of each carriage 30 utilizes sturdy fore and aft pivot plates enabling it to be hingedly connected to like adjacent members, it is obvious that by the use of appropriate interconnecting means, such as pins 35, these numerous carriage members 30 can be suitably joined together. Taken as a whole, the numerous interconnected carriages form a flexible, endless conveyor 10 suitable for carrying and transporting luggage, or for transporting other items such as mail, packages, raw materials, manufactured goods and the like. The distance between any two of the pins 35 may be twenty inches, but quite obviously we are not to be limited to this. It will later be seen from FIG. 6 that the guide wheel 60 disposed between each pair of carriages is received in a freely rotatable manner, preferably between the upper and lower pivot plates to be found at the rear of each carriage.

Figure 3:
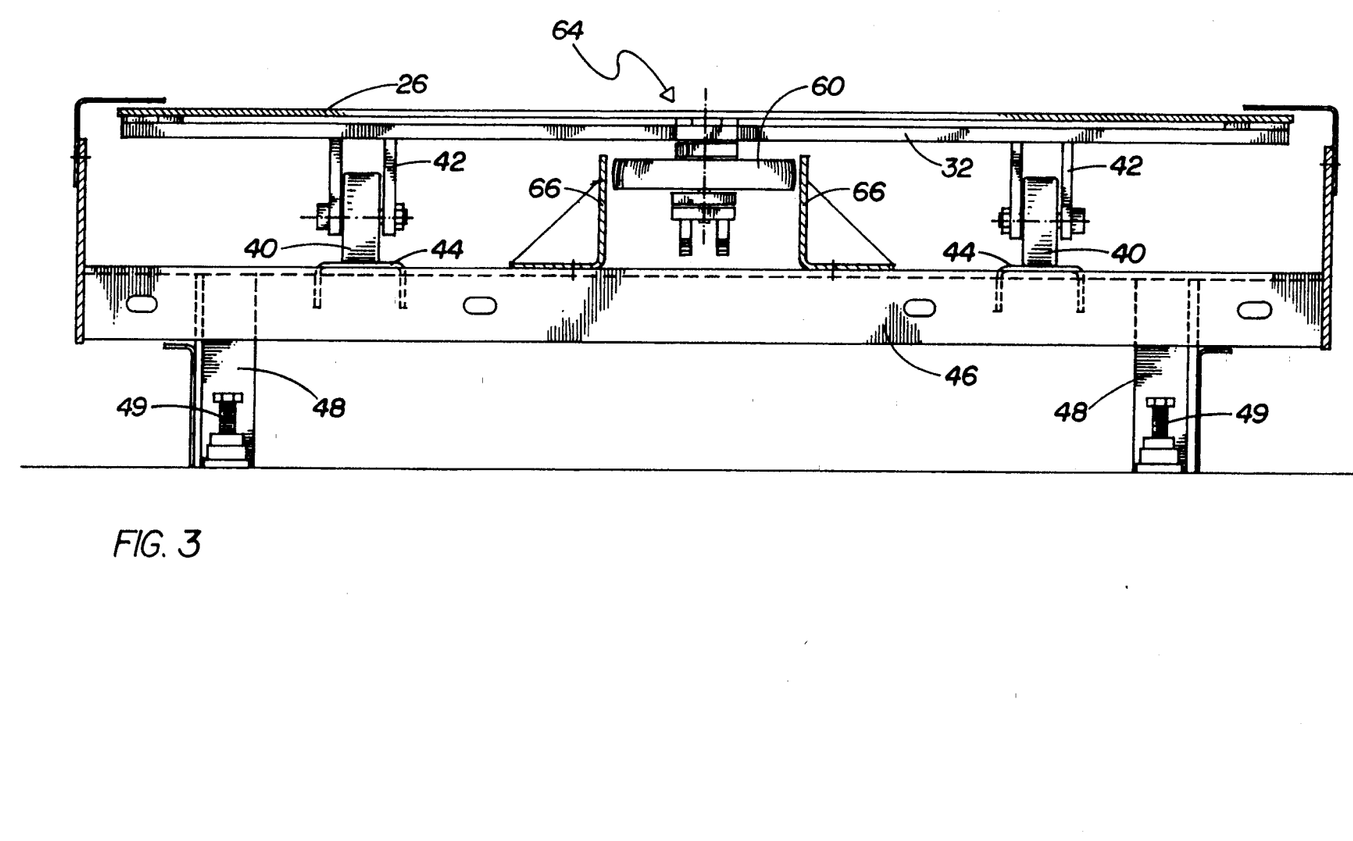
FIG. 3 is a cross sectional view revealing the relationship of a typical carriage to the guide means utilized for causing the carriages to follow the prescribed path, and also revealing the smooth, continuous tracks upon which the weight-bearing wheels of the carriages roll.

Returning to a further consideration of FIG. 2, it will be noted that each carriage member 30 is equipped with a carefully-spaced pair of supporting wheels or rollers 40, with each wheel being rotatably mounted in a suitable mounting means 42 extending downwardly from the underside of the laterally disposed plate support member or cross bar 32; note also FIG. 3. Each of the supporting wheels 40 utilizes roller or bail bearings, and is designed to roll in a low-friction manner upon a respective continuous, smooth, support track 44. For obvious reasons, the spacing or distance between the support wheels 40 on one carriage is identical to the spacing of the support wheels of all the other carriages, and the support wheel tracks 44 extending around the path or circuit 12 of the conveyor arrangement 10 are spaced apart a consistent distance that, quite understandably, conforms to the spacing of the wheels 40 on each carriage member 30. The tracks 44 are of sturdy construction, and are supported in a horizontal plane by the use of a number of frame members 46, one of which is shown in FIG. 3. The frame members occur at spaced intervals around the path or circuit 12, and generally reside in a right angle relationship to the tracks 44.

Although we are not limited to any particular spacing of the frame members 46, we have found that during straight sections of the conveyor, the frame members can be as far apart as four to five feet, whereas on curved sections, the frame members are placed somewhat closer together. As by now should be clear, the pairs of supporting wheels 40 of the numerous interconnected carriages traveling around the tracks 44 serve to support all of the weight carried on the crescent flat plates 26 that constitute the upper surface of the conveyor arrangement 10 upon which baggage is to be placed.

Figure 7:
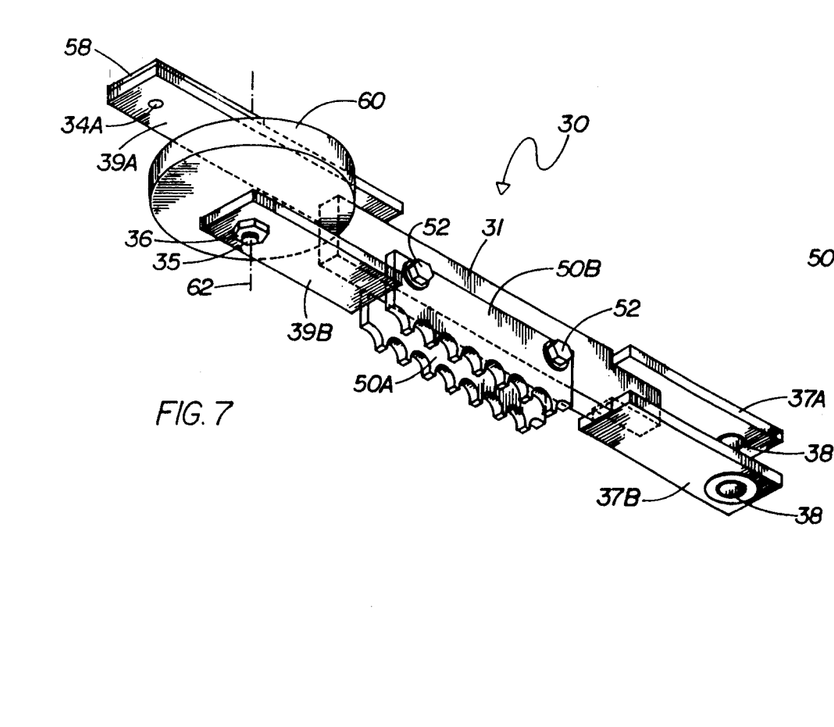
FIG. 7 is a perspective view to a substantially enlarged scale of significant structural components utilized in a typical carriage element, this figure revealing how a pair of linear sprockets may be secured in a side-by-side relationship on the carriage link, which is a structural member extending along the length of a typical carriage, and in effect serving as the backbone of the carriage.
Figure 9:
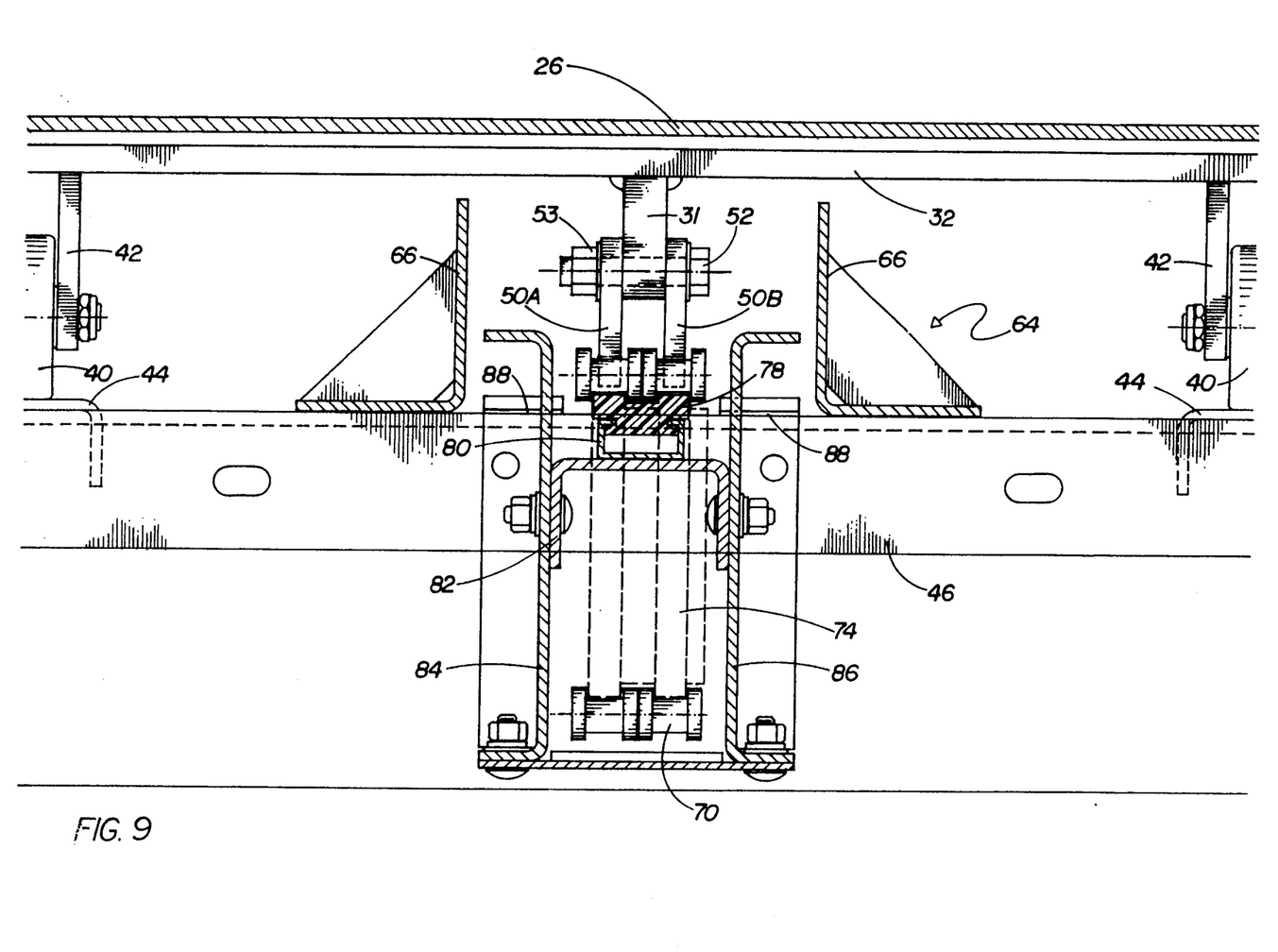
FIG. 9 is a cross sectional view to a substantially enlarged scale to reveal the guide means placed substantially equidistant between the tracks that support the wheels of each carriage, with this view also revealing the relationship between a pair of linear sprockets in accordance with this invention, and the double strand roller chain placed so as to come into contact with the downwardly extending teeth of the linear sprockets, thus to supply motive power to the conveyor.

To be noted in FIG. 2 is the utilization of a novel linear sprocket 50 on each carriage member 30, with each sprocket 50 being secured by the use of a pair of bolts 52 to the central structural member or carriage link bar 31 of each carriage member; note FIGS. 7 and 9. A locknut 53 is threadedly applied to the end of each bolt 52, to prevent the loss thereof.

Figure 6:
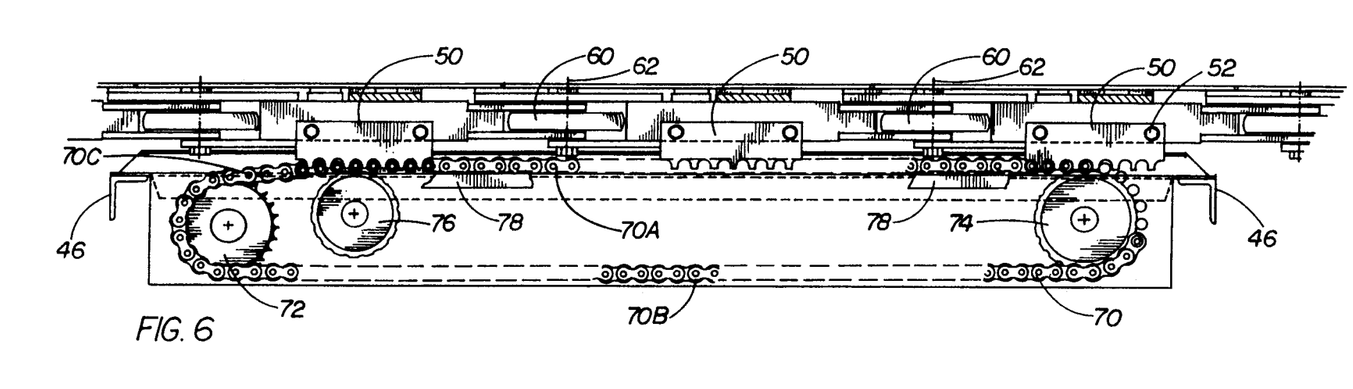
FIG. 6 is a view generally along the lines of FIG. 5, but here showing the relationship of the linear sprockets utilized on the carriages of the conveyor in such a manner as to extract power from the endless drive chain operable beneath the linear sprockets, and revealing the angularity of the drive chain at the location where each successive linear sprocket moves away from contact with the chain, thus effecting a particularly smooth and non-abrupt disengagement of each linear sprocket from the drive chain.
Figure 8:
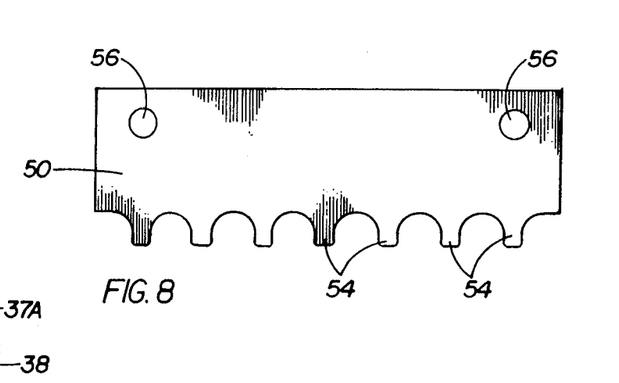
FIG. 8 is a view to an even larger scale of a typical linear sprocket in accordance with our invention.

It is important to note from FIGS. 2, 7 and 8 that the generally downwardly extending teeth 54 of each linear sprocket 50 are evenly spaced along a straight line, and these teeth are intended to engage certain components constituting a portion of the upper, active surface of an endless, motor-driven chain. The endless chain is not shown in these three figures, but chain 70 is depicted in FIG. 6, in connection with which figure it will be discussed. As will shortly be explained at some length, one or a pair of the linear sprockets 50 may be utilized on the central structural member or link bar 31 of each carriage 30. The interaction of the teeth 54 of the carefully spaced linear sprockets 50 with the components constituting a portion of the upper, active surface of the drive chain 70 provides a highly desirable motion to the interconnected carriage members 30 of the conveyor array 10, that is characterized by its smoothness and quietness.

We have already mentioned that there is no requirement for the fiat plates 26 to be operated in a precisely horizontal attitude, so inasmuch as the linear sprockets 50 are not necessarily disposed vertically, we for this reason prefer to regard the teeth 54 of the linear sprockets 50 as being generally downwardly directed.

It is to be noted that each carriage 30 has its own guide device. This preferably takes the form of a guide wheel 60, and as will be observed in FIG. 2 and 7, these guide wheels are mounted to turn about a vertical axis 62. Suitable ball or roller bearings are utilized in the construction of the guide wheels 60, to minimize rolling friction. The previously mentioned interconnecting means, the pins 35, may be utilized as the axes with respect to which the bearings of the guide wheels 60 are rotatable. The pins 35 preferably have heads thereon to prevent them dropping, under the influence of gravity, entirely through the carriage link pivot plates secured to the carriage links 31. In most instances we utilize pins 35 whose lower ends are threaded, so that a jam nut or locknut 36 of the proper size may be threaded upon the lower end of each pin, to prevent loss of the pin from the operative position. As previously mentioned, the typical spacing between pins 35 is preferably twenty inches, but we are not to be limited to this.

As revealed by the cross-sectional presentation of our invention in FIG. 3, we provide guide means 64 serving to keep these numerous guide wheels 60 and their respective carriages 30 moving in a proper, orderly manner around the desired circuit or path 12, with the weight-bearing support wheels 40 thus being maintained in an operative relationship to the tracks 44. FIG. 3 reveals that the guide means 64 may involve the use of a consistently-spaced pair of angle members 66, whose horizontally-disposed legs are firmly affixed to each frame cross member 46 it contacts. The cross member 46 of FIG. 3 is representative of the structural members used at spaced intervals (not to exceed five feet) in order to support not only the angle members 66, but also the wheel tracks 44 that extend around the circuitous path 12 traveled by the carriage members 30.

Figure 4:
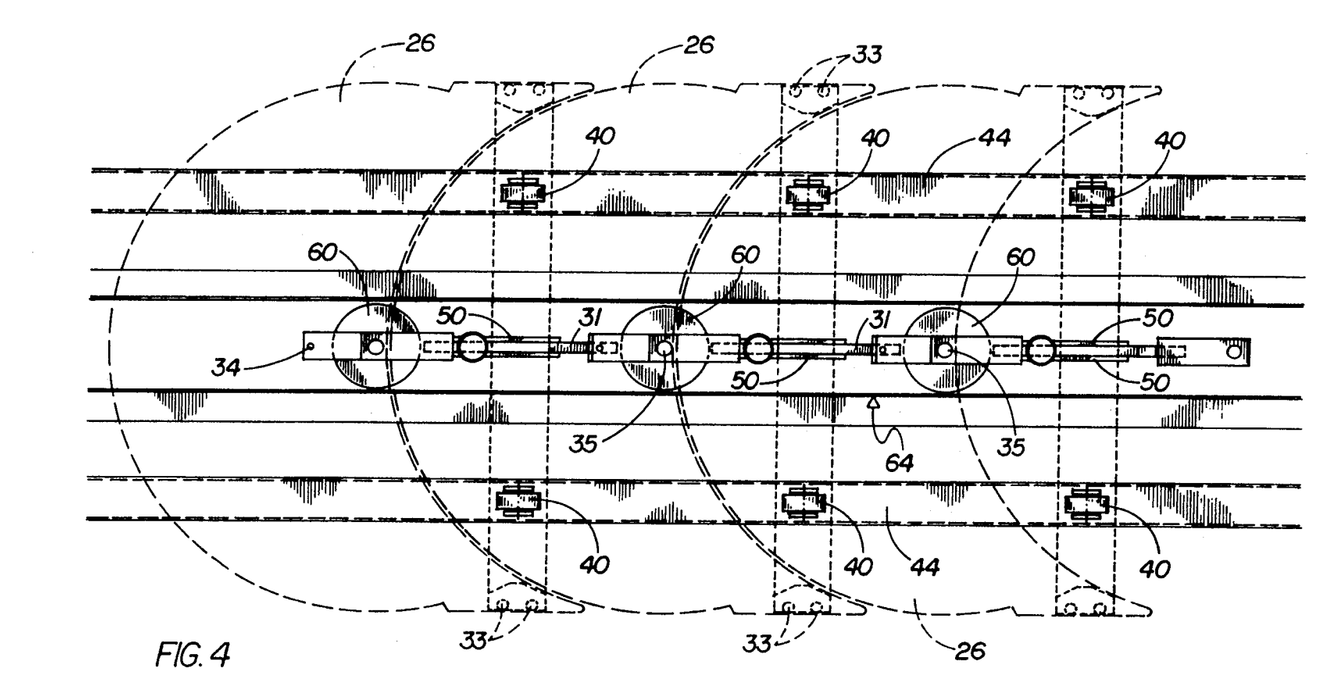
FIG. 4 is a plan view of three interconnected carriages, with this view revealing the guide means and guide wheel relationships that assure the carriages following the desired path of travel through the baggage area of an airport or the like, with this view also revealing the spaced pair of tracks upon which the support wheels of the carriages travel.

It is to be noted from FIGS. 3 and 4 that the vertically-disposed legs of the angle members 66 are intended to define a channel of uniform width, that is followed by the numerous guide wheels 60. We space the angle members 66 sufficiently far apart that a guide wheel 60 cannot be in simultaneous contact with both of the vertical legs of the angle members, for that might produce an undesirable binding effect.

As should be clear, by laying out the angle members 66 in a desired configuration, the carriage members 30 can be caused to follow the intended path of travel. As is obvious, the tracks 44 must be secured to the cross members 46 in a manner consistent with the configuration or layout of the members 66, so that the wheels 40 can be expected to follow the tracks.

A pair of end members 48 are utilized for supporting the cross members 46 in the manner depicted in FIG. 3, with each end member 48 having height adjustment means 49 thereon, enabling the numerous cross members 46 to be made level and to reside in a consistent height with respect to the other cross members 46 of the array.

Turning now to FIG. 4, it is there to be seen that we have depicted some of the essential features of this invention, with these essential features including the use of the crescent flat plates 26, the tracks 44 upon which the support wheels 40 travel, and quite importantly, the guide means 64 responsible for interacting with the guide devices—the guide wheel members 60—in such a manner as to keep the support wheels 40 in proper operative contact with their respective tracks 44.

Figure 5:
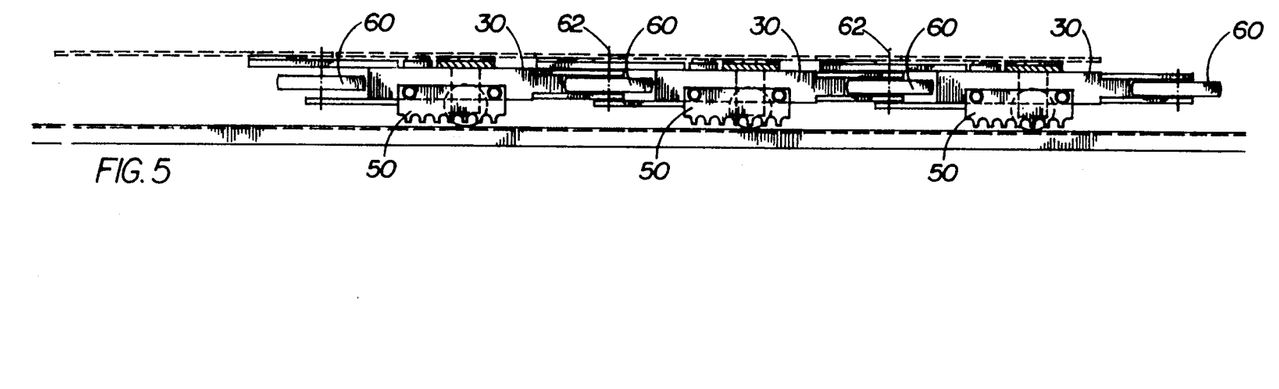
FIG. 5 is a side elevational view closely related to FIG. 4, with FIG. 5 revealing in accordance with this invention, a linear sprocket utilized on each carriage of the array, and also showing the manner in which the numerous carriage members are flexibly joined together.

It will be noted that FIG. 5 a cross-sectional view, is disposed directly below FIG. 4 in order to reveal the relationship of the guide wheels 60 to the carriage members 30 upon which they are mounted, but most importantly, FIG. 5 depicts the use of at least one linear sprocket 50 on each carriage member 30. The carefully spaced linear sprockets 50 are of course utilized in conjunction with the soon-to-be-described endless drive chain 70. From FIG. 5 it will be readily seen how the numerous carriage members 30 are flexibly joined together by the use of the vertically disposed pins 35, which pins also serve as the axes about which the guide wheels are rotatable.

Referring now to FIG. 6, it will be seen that this is a particularly important figure of drawing inasmuch as it reveals the novel relationship of the linear sprockets 50 to the endless drive chain 70. The teeth 54 of the linear sprockets 50 are designed to mesh with components constituting a portion of the upper, active surface of the chain. We preferably utilize a #80 double strand roller chain, in which case the components with which the teeth 54 of the linear sprockets mesh are rollers extending between the links of the chain 70. Other chains utilized in lieu of a roller chain would present components other than the rollers mentioned in conjunction with a roller chain.

The endless chain 70 is operatively disposed between the front or drive sprocket 72, which is the location at which power is directly applied to the chain, and the rear sprocket 74, which is an idler sprocket.

it is important we maintain the upper, active span 70A of the chain 70 in a flat, horizontal manner, such that it will be positioned so as to be effectively contacted by the consistently spaced teeth 54 of the linear sprockets 50 of the carriage members 30. One factor in maintaining the upper chain span 70A in a flat, horizontal manner is by our use of an idler sprocket 76 whose apex is mounted at a height that is consistent with the height of the apex of the idler sprocket 74. In addition, we utilize an ultra high molecular weight polyethylene chain guide 78, specifically designed for supporting a #80 double strand roller chain. A chain guide is typically between thirty and forty inches long, and is visible in FIGS. 6 and 9. The chain guide is of conventional construction, and is supported by the members 80 and 82. The member 82 is in turn supported by side rails 84 and 86.

It is to be understood that the idler sprockets 74 and 76 are equipped with teeth of abbreviated height, or else have no teeth at all. This construction is used so that the teeth 54 of the linear sprockets 50, when in contact with the endless drive chain, will readily clear the idler sprockets.

It is to be noted from FIG. 6 that the idler sprocket 76 is located comparatively close to the drive sprocket 72, and that the sprocket 76 is preferably of smaller diameter than the diameter of the idler sprocket 74. This arrangement is utilized so that the lower or return span of the chain, span 70B, will clear the lower portion of the idler sprocket 76.

It is important to observe that the drive sprocket 72 is disposed lower than the level at which the idler sprockets 74 and 76 are located. One reason why this is done is to permit the teeth 54 of each linear sprocket 50 to clear the teeth of the drive sprocket 72, which are full-height teeth. Another reason is to cause the chain to slope downwardly from the upper part of the idler sprocket 76 to the drive sprocket 72, to form the angled chain portion 70C. We have found that the downward angularity of the chain portion 70C is quite advantageous in successively bringing about a progressive disengagement of each tooth of each linear sprocket from the chain, which is a much smoother disengagement of the linear sprockets 50 from the drive chain than would ordinarily be possible.

It is to be understood that although we are not to be limited to any particular length of the drive chain, we find that in some instances, it is desirable for the upper span or active portion 70A of the drive chain 70 to extend a distance of approximately four feet along the path of travel of the conveyor 10. The precise length of the endless chain 70 is not particularly critical to this invention, and by way of illustration, if the chain were laid out flat, it would probably be on the order of 10 feet in length. It is important, however, that the upper span 70A of the chain be long enough such that at any one time, not less than two nor more than three of our novel linear sprockets 50 engage the upper, active portion or span 70A of the drive chain 70.

Also with respect to FIG. 6 it is to be noted that we prefer for the pivot plates welded or otherwise secured to the front of each carriage link or central structural member 31 to be spaced more widely apart than are the pivot plates welded or otherwise secured to the rear of each carriage link or central structural member 31. In accordance with this arrangement, the guide wheel 60 is arranged to fit directly between the pivot plates located at the rear of the carriage link or member 31, and the pivot plates located at the rear of one carriage member 30 are received in a low friction manner between the pivot plates of the carriage immediately following.

With reference now to FIG. 7, which is created to a relatively large scale, it is to be seen that we are not to be limited to an arrangement in which only a single linear sprocket 50 is utilized on each carriage 30, for as revealed in FIG. 7, a pair of linear sprockets, sprockets 50A and 50B, may be utilized. As visible in this figure, one sprocket is utilized on each side of the carriage link or central structural member 31. The sprockets 50A and 50B are held in a fully operative, side-by-side relationship by a pair of bolts 52 that extend through the longitudinally disposed carriage link or central structural member 31 of each carriage. As seen in FIG. 8, a spaced pair of precisely located holes 56 are utilized in each of the aligned linear sprockets 50 to receive the bolts 52. When a pair of linear sprockets are utilized in an adjacent, side-by-side relationship on a given carriage link or central structural member 31, the teeth of one linear sprocket are carefully aligned with the teeth of the other linear sprocket, so that the components (rollers) of the double strand roller chain 70 will be simultaneously and properly engaged by both linear sprockets 50. We prefer the use of the side-by-slide linear sprockets when a sizable lead is to be carried by the conveyor 10, held firmly in place thereon by the use of threaded bolts 52, on the end of each of which, a lock nut 53 is utilized. As is obvious, the drive chain 70 with in each instance be of appropriate width, being for example a #80 double strand roller chain, with the teeth of both linear sprockets carefully aligned with the rollers of the chain.

It is to be additionally noted that for light loads, a certain amount of expense can be saved by utilizing only a single linear sprocket 50 on each carriage 30. If only single sprockets are used, the side of the carriage centerline upon which a linear sprocket is used would alternate from carriage to carriage, to prevent any unbalance.

To be noted at the right hand end of the structural components revealed in FIG. 7 are the upper pivot plate 37A and the lower pivot plate 37B, which are welded in a carefully spaced relationship to the rear end of the carriage link or central structural member 3.1. Carefully aligned holes 38 extend through both plates. To the front end of the carriage link or central structural member 31 are secured the upper pivot plate 39A and the lower pivot plate 39B, which are spaced more widely apart than are the pivot plates 37A and 37B, as was pointed out in conjunction with FIG. 6. Although not visible in FIG. 7, aligned holes extend through both the upper pivot plate 39A and the lower pivot plate 39B, for receiving the pin 35 when the carriages are being assembled together.

Although we have shown the guide wheel 60 placed between the upper pivot plate 39A and the lower pivot plate 39B at the front of the structural components depicted in FIG. 7, the guide wheel actually resides in a low friction relationship between the upper and lower pivot plates 37A and 37B located at the rear of the components depicted in FIG. 7, being held in place by the previously mentioned pin or bolt 35. A lock nut 36 threadedly engages the threads located on the lower end of the pin or bolt 35, to hold it in place, although another form of a device to prevent loss or displacement of the pin 35 could be utilized if desired.

It will be noted from FIG. 7 that upper pivot plate 39A extends forward in a cantilever manner beyond the guide wheel 60, or in other words, the upper pivot plate 39A extends further forward than does the lower pivot plate 39B. The arrangement is utilized in order that the forwardly-extending portion of plate 39A can serve as a support for the central portion of the respective crescent flat plate 26. We may utilize a spacer 58 between the upper surface of the pivot plate 39A, and the underside of the flat plate 26. A threaded hole 34A located relatively near the forward edge of the plate 39A is arranged to receive the previously-mentioned screw 34 at such time as the crescent flat plate is being attached to the carriage.

As will be apparent from FIGS. 5 and 6, when the holes in the upper and lower pivot plates 37A and 37B at the rear of one carriage are lined up with the holes in the upper and lower pivot plates 39A and 39B at the front of the immediately following carriage, the guide wheel 60 is inserted between the pivot plates 37A and 37B, and then the pin 35 inserted through all of the aligned holes and the central hole of the guide wheel. This serves to join the two carriages together in a flexible and highly satisfactory manner. We prefer to utilize flat, low friction bearings at the locations where the pivot plates of one carriage might otherwise develop an undesirable amount of friction with respect to the pivot plates of the other carriage.

With reference now to FIG. 8, it may be seen that this figure has been created to a large scale in order to reveal that each of the linear sprockets 50 may for example be typically on the order of $7\frac{1}{2}$ inches in length, and each sprocket preferably utilizes seven teeth 54 disposed in an evenly-spaced, straight array. However, we of course are not to be limited to such a length or to this number of teeth. At least one but possibly two linear sprockets 50 are utilized on each carriage member 30, as previously mentioned.

It is to be understood to be highly desirable for the spacing of the linear sprockets 50 along the circuit or path 12 of the conveyor to be such that at any one moment, no less than the full component of teeth of the linear sprockets 50 of two carriage members engage the upper, active span 70A of the endless drive roller chain 70. Quite importantly, the pitch of the teeth 54 used on each of the numerous linear sprockets 50 of the carriage array is carefully matched to the spacing of the rollers of the endless drive chain 70.

Continuing with a consideration of FIG. 8, it is to be understood that the teeth 54 of each of the linear sprockets 50 are carefully configured so that the spacing of the rollers of the chain 70 is such as to contact each tooth of the sprocket 50 at a zero pressure angle. When a zero pressure angle exists, there is no up or down force. The zero pressure angle exists between a given roller of the chain, and a respective tooth when the linear sprocket 50 is fully meshed with the chain 70. Each tooth 54 is described as a cycloidal tooth, with a suitable clearance radius provided along the lower edge of each tooth.

Returning to the earlier made point that the teeth 54 of at least two adjacent carriages must properly engage the double wide drive chain 70 at any one moment, it will be readily understood that the linear sprocket 50 of each carriage 30 must be carefully installed, such that the teeth 54 of one linear sprocket 50 are engaging the rollers of the drive chain 70 simultaneously with the teeth 54 of the linear sprocket 50 of the adjacent carriage also engaging rollers of the drive chain 70.

FIG. 9 is a view created to a larger scale than FIG. 3, to which it bears some similarity, with it being a purpose of FIG. 9 to reveal that when we use side-by-side linear sprockets 50A and 50B on the longitudinally disposed central structural member 31 of each carriage 30, a proper operative relationship of the sprockets with the double width chain 70 is made more certain by our use of a conventional chain guide 78. Also revealed in FIG. 9 are the locations of the angle members 66 and the position of the idler sprocket 74.

Continuing with FIG. 9, in this figure we reveal that the chain guide 78 is supported by a chain guide mounting channel 80, which is generally of U-shaped configuration. The mounting channel 80 is in turn supported by a support channel 82 that is of inverted U-shaped configuration. The support channel is of high strength material and is bolted between the drive side rail 84 and the drive side rail 86.

Also visible in FIG. 9 are shims 88, which are utilized to provide adjustability for the drive arrangement. Adding or removing shims may be brought about when it is necessary to incrementally raise or lower the entire drive mechanism, to assure that the upper, active portion 70A of the roller chain will be in a position such as to have a highly desirable mesh with the linear sprockets 50.

Figure 10:
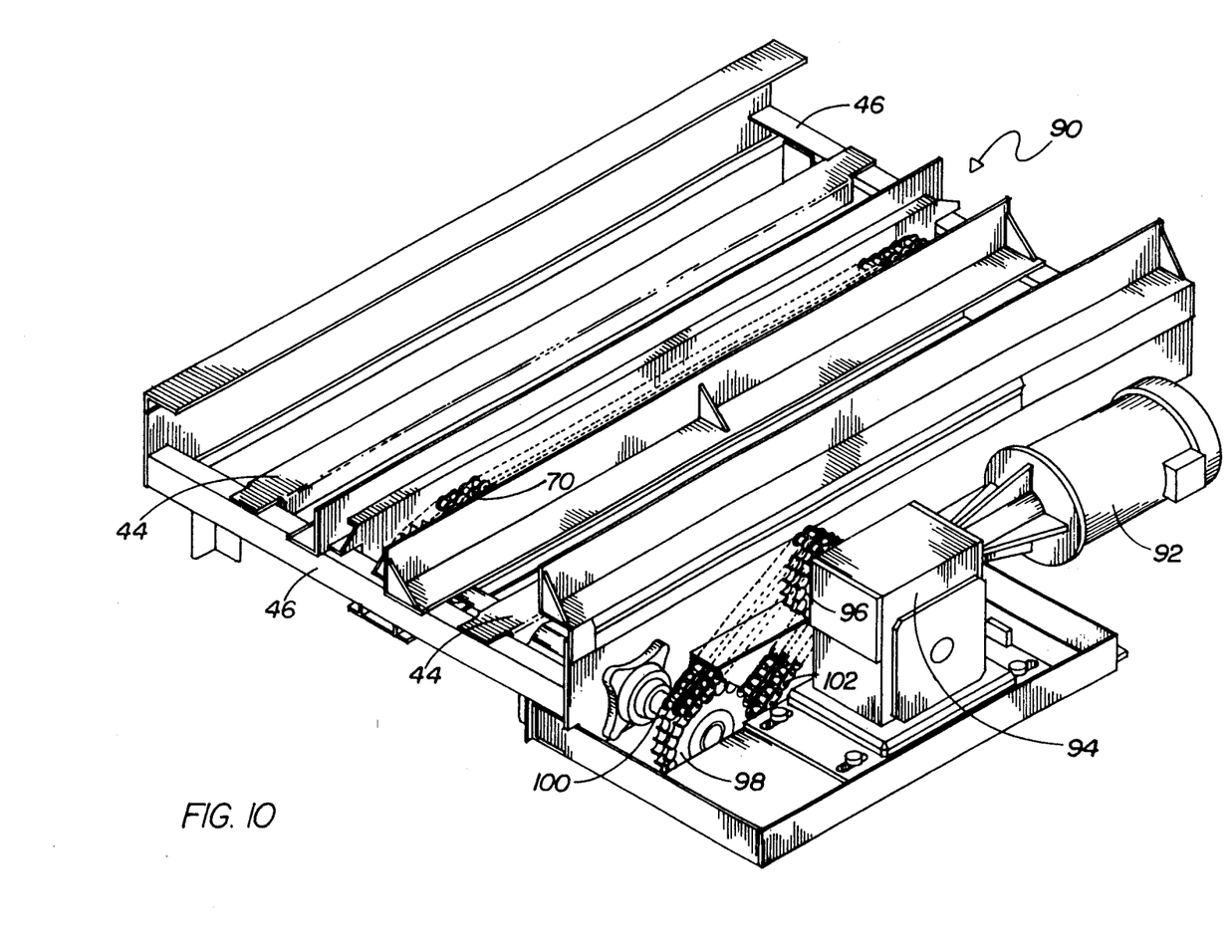
FIG. 10 is a perspective view revealing a drive frame assembly to be mounted adjacent the endless drive chain utilized in accordance with our invention, with the arrangement being such that the chain is driven such that the upper surface of the chain can contact and reliably supply power to the teeth of the novel linear sprockets utilized on each of the interconnected carriages constituting our conveyor.

From referring to FIG. 10, it is to be understood that the endless drive chain 70 is operatively mounted in a drive unit 90, with such a drive unit typically residing alongside one portion of the tracks 44 of the conveyor unit. An electric drive motor 92 of suitable size is operatively mounted on one portion of the drive unit 90. Inasmuch as the drive chain 70 moves relatively slowly as compared witch the rotational speed of the drive motor 92, we connect the drive motor to a speed reduction device 94, so that the shaft output of the device 94 will be generally commensurate with a desirable longitudinal speed of the endless chain 70. Power may be applied to the toothed drive sprocket 72 of the drive chain 70 by installing an output sprocket 96 on the output of the speed reduction device 94, and utilizing an input sprocket 98 on the shaft 100 upon which the drive sprocket 72 is mounted. Extending between the sprocket 96 and the somewhat larger sprocket 98 is an endless drive chain 102, preferably a #80 double strand roller chain of the same type as utilized for the drive chain 70, though shorter in length. We obviously are not limited to the use of a #80 double strand roller chain, for chains of a different size or type may be necessary to use in certain installations.

To achieve smooth and quiet application of power to the carriage members of our novel conveyor, it is vital that the linear sprocket teeth on each of the carriage members of the carriage array must be synchronized with the pitch (distance between chain roller centers) of the drive chain. Synchronization is accomplished in the manufacturing process by accurate machining of critical components, and the use of welding fixtures and assembly jigs. By this means it can be assured that the parts and assemblies crucial to the correct linear sprocket tooth-to-chain-roller dynamic time-space relationship meet the necessary standards for smooth and satisfactory operation.

It will be noted from referring back to FIG. 1 that the power applying location or area 20 would typically be in the baggage loading area 14, so as to make it readily available to maintenance personnel should the occasion for repair or replacement arise. In the case of long conveyors, more than one power applying location could of course be utilized in accordance with this invention, such as at location 22.

Upon the carriage members 30 constituting the conveyor 10 being hingedly connected to form an endless arrangement, and the linear sprocket(s) 50 of each carriage 30 being placed in a careful relationship to the double strand roller chain 70, the resulting arrangement will be responsible for assuring the transmitting of maximum thrust from the chain 70 to each linear sprocket 50 of the carriage members in a highly advantageous manner, without any up or down component of thrust being created. In other words, the close agreement of the teeth 54 of the linear sprockets 50 with the spacing of the rollers of the chain 70 will bring about a very smooth application of power to the chain 70, accomplished in an exceedingly quiet manner.

Because we have designed the drive chain-linear sprocket relationship such that each sprocket 50 will smoothly engage and smoothly disengage the roller chain 70, there is almost a complete absence of any jerky motion or vibration, such as would accompany an abrupt disengagement.

We claim:

1. A conveyor arranged to travel along a prescribed path, the upper surface of such conveyor being constituted by a comparatively large number of separate segments, with each segment being supported by a carriage member, said conveyor utilizing a substantial number of interconnected carriage members, with at least one elongate linear sprocket attached to each carriage member, each linear sprocket having a number of consistently spaced, generally downwardly directed teeth, which are successively brought into operative contact with a powered endless chain that is disposed under, and in general alignment with, the intended path of travel of said carriage members, the upper, active surface of said endless chain traveling in the same direction as the intended direction of movement of said conveyor, with the teeth of said linear sprockets attached to said carriage members being positioned so as to successively come into an operable relationship with components constituting the upper, active surface of said endless chain as said carriage members travel around the prescribed path, the teeth of at least two of said linear sprockets at any one moment engaging the components of the upper, active surface of said endless chain, a zero pressure angle existing between a given component of said endless chain, and a respective tooth when a linear sprocket is fully meshed with said endless chain, thus eliminating any up or down component, said chain and sprockets thus providing continuous power and therefore causing said carriage members and the segments supported thereby to move around the prescribed path of travel.

2. The conveyor arranged to travel along a prescribed path as recited in claim 1 in which at least some of the teeth of at least three of said linear sprockets are at any one moment engaging said components of the upper, active surface of said endless chain, with the teeth of a third linear sprocket starting to engage the upper, active surface of said chain during the same time period in which the teeth of a first linear sprocket are in the process of disengaging from the chain, with all of the teeth of the second linear sprocket, located between the first and third linear sprockets, being in contact with the upper, active surface of said chain at this particular time.

3. The conveyor arranged to travel along a prescribed path as recited in claim 1 in which each adjacent pair of carriage members are hingedly interconnected by the use of a vertically disposed pin.

4. The conveyor arranged to travel along a prescribed path as recited in claim 1 in which interconnecting means are utilized for interconnecting each adjacent pair of carriage members, said interconnecting means also serving as a guide device, and a guide channel mounted in the prescribed path of travel of said carriage members, said guide device interacting with said guide channel and thus keeping said carriage members moving around the prescribed path of travel.

5. The conveyor arranged to travel along a prescribed path as recited in claim 1 in which each adjacent pair of carriage members is interconnected by the use of a vertically disposed pin, said pin also serving as the mounting means for a guide wheel disposed to rotate in a generally horizontally disposed plane about a generally vertically disposed axis, and a guide channel mounted in the prescribed path of travel of said carriage members, the guide wheel disposed between each adjacent pair of carriages serving to interact with said guide channel, and thus keep said carriage members moving around the prescribed path of travel for the conveyor.

6. The conveyor arranged to travel along a prescribed path as recited in claim 1 in which a pair of linear sprockets are utilized in an adjacent, side-by-side relationship on at least some carriage members, with the teeth of one linear sprocket residing in a carefully aligned relationship to the teeth of the adjacent linear sprocket, and said endless chain is a double strand roller chain, of a suitable width to simultaneously engage the teeth of two adjacent linear sprockets.

7. The conveyor arranged to travel along a prescribed path as recited in claim 1 in which each tooth of each of said linear sprockets is a cycloidal tooth, with a suitable clearance radius provided along the lower edge of each tooth, to assure smooth engagement and disengagement with said chain.

8. A conveyor arranged to travel along a prescribed path, said conveyor having an upper surface constituted by a comparatively large number of separate segments, with each segment supported by a carriage member, said conveyor utilizing a comparatively large number of interconnected carriage members, at least one elongate linear sprocket attached to each carriage member, each linear sprocket having a number of consistently spaced, generally downwardly directed teeth, and power-applying means for applying power to said conveyor, said power-applying means utilizing an endless chain disposed under, and in general alignment with, the path of travel of said carriage members of said conveyor, with the teeth of said linear sprockets able to mesh with components constituting the upper surface of said chain, means for supporting said endless chain such that the upper, active surface of said chain is maintained in a relatively taut condition, said means for applying power to said conveyor causing such upper, active surface of said endless chain to travel in the same direction as the intended direction of movement of said conveyor, and with said teeth of said linear sprockets attached to said carriage members being positioned so as to successively come into an operable relationship with the components constituting the upper surface of said endless chain as said carriage members travel around the prescribed path, with the teeth of at least two of said linear sprockets at any one moment engaging the components of said upper surface of said endless chain, a zero pressure angle existing between a given component of said endless chain and a respective tooth when a linear sprocket is fully meshed with said endless chain thus eliminating any up or down component, said chain and sprockets thus providing continuous power and therefore causing said carriage members and the segments supported by said carriage members to move around the prescribed path of travel of said conveyor.

9. The conveyor arranged to travel along a prescribed path as recited in claim 8 in which at least some of the teeth of at least three of said linear sprockets are at any one moment engaging the components of the upper, active surface of said endless chain, with the teeth of a third linear sprocket starting to engage the components of the upper, active surface of said chain during the same time period in which the teeth of a first linear sprocket are in the process of disengaging from the chain, with all of the teeth of the second linear sprocket, located between the first and third linear sprockets, being in contact with the components of the upper, active surface of said chain at this particular time.

10. The conveyor arranged to travel along a prescribed path as recited in claim 8 in which each adjacent pair of carriage members are hingedly interconnected by the use of a vertically disposed pin.

11. The conveyor arranged to travel along a prescribed path as recited in claim 8 in which interconnecting means are utilized for interconnecting each adjacent pair of carriage members, said interconnecting means also serving as a guide device, and a guide channel mounted in the prescribed path of travel of said carriage members, said guide device interacting with said guide channel and thus keeping said carriage members moving around the prescribed path of travel.

12. The conveyor arranged to travel along a prescribed path as recited in claim 8 in which each adjacent pair of carriage members is interconnected by the use of a vertically disposed pin, said pin also serving as the mounting means for a guide wheel disposed to rotate in a generally horizontally disposed plane about a generally vertically disposed axis, and a guide channel mounted in the prescribed path of travel of said carriage members, the guide wheel disposed between each adjacent pair of carriages serving to interact with said guide channel, and thus keep said carriage members moving around the prescribed path of travel for the conveyor.

13. The conveyor arranged to travel along a prescribed path as recited in claim 8 in which a pair of linear sprockets are utilized in an adjacent, side-by-side relationship on each carriage member, with the teeth of one linear sprocket residing in a carefully aligned relationship to the teeth of the adjacent linear sprocket, and said endless chain is a double strand roller chain, of a suitable width to simultaneously engage the teeth of two adjacent linear sprockets.

14. The conveyor arranged to travel along a prescribed path as recited in claim 8 in which each tooth of each of said linear sprockets is a cycloidal tooth, with a suitable clearance radius provided along the lower edge of each tooth, to assure smooth engagement and disengagement with the rollers of said chain.

15. A baggage handling conveyor arranged to travel along a prescribed path through a baggage room, said conveyor having an upper surface constituted by a comparatively large number of separate segments, with each segment supported by a wheeled carriage member, said conveyor being principally constituted by a comparatively large number of interconnected wheeled carriage members, with each carriage member having a central structural member disposed along its longitudinal centerline, at least one elongate linear sprocket attached to the central structural member of each of said carriage members, each linear sprocket having a straight side along which a number of consistently spaced, generally downwardly directed teeth are disposed, and power-applying means for applying power to said conveyor, said power-applying means utilizing an endless chain supported by a spaced pair of circular sprockets operatively disposed under, and in general alignment with, the path of travel of said carriage members of said conveyor, with the teeth of said linear sprockets able to mesh with components constituting the upper surface of said chain, said circular sprockets supporting said endless chain such that the active, upper surface of said endless chain is maintained in a relatively taut condition, said means for applying power to said conveyor causing such active, upper surface of said endless chain to travel in the same direction as the intended direction of movement of said conveyor, and with the lower span of said endless chain traveling in the return direction, said teeth of the linear sprockets attached to said carriage members being positioned so as to successively come into an operable relationship with components constituting a portion of the upper, active surface of said endless chain as said carriage members travel around the prescribed path, with the teeth of at least two of said linear sprockets at any one moment engaging the components of said upper, active surface of said endless chain, a zero pressure angle existing between a given component of said endless chain, and a respective tooth when a linear sprocket is fully meshed with said endless chain, thus eliminating any up or down component, said chain and sprockets thus providing continuous power and therefore causing said carriage members and the segments supported by said carriage members to move around the prescribed path of travel of said conveyor.

16. The conveyor arranged to travel along a prescribed path as recited in claim 15 in which at least some of the teeth of at least three of said linear sprockets are at any one moment engaging the components of the upper, active surface of said endless chain, with the teeth of a third linear sprocket starting to engage the upper, active surface of said chain during the same time period in which the teeth of a first linear sprocket are in the process of disengaging from the chain, with all of the teeth of the second linear sprocket, located between the first and third linear sprockets, being in contact with the components of the upper, active surface of said chain at this particular time.

17. The conveyor arranged to travel along a prescribed path as recited in claim 15 in which a toothed sprocket for directly applying power to said endless chain is located at the termination of the upper, active surface of the chain, where the chain turns to begin its travel in the return direction, said toothed sprocket for applying power being disposed at a somewhat lower position than said circular sprockets utilized for supporting the upper, active surface of said endless chain, the portion of the chain for a given moment extending between the circular sprocket nearer said toothed sprocket, and said toothed sprocket, because of the difference in height of such sprockets, causing said portion of the upper surface of said chain to extend downwardly at an angle, with the downward angling of that chain portion successively bringing about a progressive disengagement of each tooth of each linear sprocket from said chain.

18. The conveyor arranged to travel along a prescribed path as recited in claim 15 in which each adjacent pair of carriage members are hingedly interconnected by the use of a vertically disposed pin.

19. The conveyor arranged to travel along a prescribed path as recited in claim 15 in which interconnecting means are utilized for interconnecting each adjacent pair of carriage members, said interconnecting means also serving as a guide device, and a guide channel mounted in the prescribed path of travel of said carriage members, said guide device interacting with said guide channel and thus keeping said carriage members moving around the prescribed path of travel.

20. The conveyor arranged to travel along a prescribed path as recited in claim 15 in which each adjacent pair of carriage members is interconnected by the use of a vertically disposed pin, said pin also serving as the mounting means for a guide wheel disposed to rotate generally in a horizontal plane about a generally vertically disposed axis, and a guide channel mounted in the prescribed path of travel of said carriage members, the guide wheel disposed between each adjacent pair of carriages serving to interact with said guide channel, and thus keep said carriage members moving around the prescribed path of travel for the conveyor.

21. The conveyor arranged to travel along a prescribed path as recited in claim 15 in which a pair of linear sprockets are utilized in an adjacent, side-by-side relationship on at least some carriage members, with the teeth of one linear sprocket residing in a carefully aligned relationship to the teeth of the adjacent linear sprocket, and said endless chain is a double strand roller chain, of a suitable width to simultaneously engage the teeth of two adjacent linear sprockets.

22. The conveyor arranged to travel along a prescribed path as recited in claim 15 in which each tooth of each of said linear sprockets is a cycloidal tooth, with a suitable clearance radius provided along the lower edge of each tooth, to assure smooth engagement and disengagement with said endless, chain.

23. The conveyor arranged to travel along a prescribed path as recited in claim 15 in which the wheels utilized for supporting the weight of each wheeled carriage member each utilize anti-friction bearings.

24. The conveyor arranged to travel along a prescribed path as recited in claim 23 in which said wheels are operatively associated with a supporting track members upon which said, wheels roll, said track members conforming to the configuration of the desired path of travel of the conveyor.

* * * * *